(12) United States Patent
Yamada et al.

(10) Patent No.: US 7,161,502 B2
(45) Date of Patent: Jan. 9, 2007

(54) INFORMATION DISPLAY SYSTEM

(75) Inventors: Kunihiro Yamada, Okazaki (JP); Yumi Shibata, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 281 days.

(21) Appl. No.: 10/415,146

(22) PCT Filed: May 31, 2002

(86) PCT No.: PCT/JP02/05378

§ 371 (c)(1),
(2), (4) Date: Apr. 25, 2003

(87) PCT Pub. No.: WO03/021189

PCT Pub. Date: Mar. 13, 2003

(65) Prior Publication Data

US 2004/0100460 A1    May 27, 2004

(30) Foreign Application Priority Data

Aug. 31, 2001   (JP) .............................. 2001-262695

(51) Int. Cl.
*G08G 1/123* (2006.01)

(52) U.S. Cl. ............................. 340/995.1; 340/995.12; 340/995.13; 340/995.19; 340/995.23; 340/995.27; 701/200; 701/201; 701/208

(58) Field of Classification Search ............. 340/995.1, 340/995.12, 995.13, 995.19, 995.23, 995.27; 701/200, 201, 208
See application file for complete search history.

(56) References Cited

U.S. PATENT DOCUMENTS

| | | | | |
|---|---|---|---|---|
| 5,790,974 A | * | 8/1998 | Tognazzini | 455/456.5 |
| 5,855,006 A | * | 12/1998 | Huemoeller et al. | 705/9 |
| 5,948,040 A | * | 9/1999 | DeLorme et al. | 701/201 |
| 6,275,231 B1 | * | 8/2001 | Obradovich | 701/36 |
| 6,675,089 B1 | * | 1/2004 | Hirabayashi et al. | 701/200 |
| 6,678,613 B1 | * | 1/2004 | Andrews et al. | 701/213 |
| 6,842,696 B1 | * | 1/2005 | Silvester | 701/213 |
| 2002/0030698 A1 | * | 3/2002 | Baur et al. | 345/733 |

FOREIGN PATENT DOCUMENTS

| | | |
|---|---|---|
| JP | A-11-51671 | 2/1999 |
| JP | A 11-51671 | 2/1999 |
| JP | A-11-94583 | 4/1999 |
| JP | A-11-282864 | 10/1999 |
| JP | A 2000-215211 | 8/2000 |

(Continued)

*Primary Examiner*—Jeffery Hofsass
*Assistant Examiner*—Samuel J. Walk
(74) *Attorney, Agent, or Firm*—Oliff & Berridge, PLC

(57) ABSTRACT

An information display system for displaying a map that covers an area around a pre-registered point relevant to a date or a date and time. The position of the pre-registered point on the map is readily and accurately identified using the operator's selection of the date or the date and time. The information display system, include a map information storage in which map information is stored; an input device to input a designated point relevant to a date or a date and time; a schedule information storage unit in which the designated point is stored relevant to a date or a date and time; a display device on which a calendar and a map are displayed; and a display control device by which a map covering a point relevant to a date, or a date and time, either of which being selected from the calendar, is displayed on the display device.

13 Claims, 11 Drawing Sheets

FOREIGN PATENT DOCUMENTS

| | | |
|---|---|---|
| JP | A-2000-215211 | 8/2000 |
| JP | A-2001-092878 | 4/2001 |
| JP | A-2001-108457 | 4/2001 |
| JP | A 2001-109764 | 4/2001 |
| JP | A-2001-109764 | 4/2001 |
| JP | A-2001-165693 | 6/2001 |
| WO | WO 99/06987 | 2/1999 |

* cited by examiner

FIG. 6

| SCHEDULE DESTINATION | | |
|---|---|---|
| SCHEDULED TIME | 2001/09/13 16:00 | |
| NAME | △△ RAIL STATION | |
| MEMO | | |
| ADDRESS | ○○ AAA PREFECTURE ×× CCC CITY △△ BBB CHO | |
| TELEPHONE | | INPUT DATE |

FIG. 10

INFORMATION DISPLAY SYSTEM

BACKGROUND OF THE INVENTION

1. Field of Invention

This invention relates to an information display system.

2. Description of Related Art

Conventional navigation apparatuses installed in a vehicle such as an automobile have been provided. In such navigation apparatuses, an optimum route from a set start point to a set destination is searched based on road map data, and then is displayed on a display means. In such optimum route search, a route which takes the shortest distance or the shortest necessary time from the start point to the destination is searched.

Further, as disclosed in Japanese Patent Laid-open No. 2001-296135, a conventional navigation apparatus employing a calendar function for destination preset has been provided. To preset a destination in this navigation apparatus, an operator, such as a driver of the vehicle, selects a date from a calendar displayed on a display screen of the navigation apparatus. Thereby, on the actual day of the preset date, the navigation apparatus automatically searches a route to the preset destination.

This enables the operator to readily find the route to the preset destination without his/her setting of the destination on the day of actual traveling, because the navigation apparatus automatically searches and displays the route to the destination.

However, when confirming the preset items, these conventional navigation apparatuses display disadvantageously only the date and a name of the preset destination on the display screen. This is very inconvenient for the operator, particularly when he/she wants to obtain information about a position of the destination on the map and also information about facilities located around the destination.

As a result, in a case where the operator wants to confirm the preset items and also wants to obtain the map covering an area around the destination as well as identify the name of the facilities located around the destination, he/she has to again input the name of the destination which having been once displayed on the display screen. Such repetitious input is considerably time-consuming as well as difficult to the operator.

Further, because information about operator's own schedule, which may already have been inputted to his/her personal computer or electronic personal organizer, cannot be directly exported to the conventional navigation apparatus, the operator has to operate the navigation apparatus to re-input the date and the destination when presetting the destination in the conventional navigation apparatus. Accordingly, the operator, by looking at his/her schedule displayed onto the display screen of his personal computer or electronic personal organizer, has to input the date and the destination one-by-one by operating the navigation apparatus. This is further time-consuming as well as difficult to the operator.

To solve the above problems associated with conventional navigation apparatus, the invention provides an information display system by which a map covering an area around a point which pre-registered relevant to a date may be displayed. The position of said pre-registered point on the map may be readily and accurately identified, and other information about the area around said pre-registered point may also be obtained.

SUMMARY OF THE INVENTION

An exemplary embodiment of an information display system according to the invention, comprises a map information storage that stores map information; an input device used to input a designated point relevant to a date, or a date and time; a schedule information storage that stores the designated point relevant to a date or a date and time; a display device that displays a calendar and a map; and a display control device by which a map covering the designated point relevant to a date or a date and time, either of which being selected from the calendar, is displayed on the display device.

With the information display system in above described structure, the operator may readily identify a specific site point, a destination point, or a facility point on the map, where each point represents a target point of each schedule, such as a drive, a trip, recreations, sports, eat-out, or sightseeing. At the same time, the operator may be informed of the condition of the facility or a road located around said points.

Another exemplary embodiment of an information display system according to the invention, comprises a server that includes a map information storage, a schedule information storage, and a transmit/receive unit; a first information terminal said that includes an input device and a transmit/receive unit; and a second information terminal that includes a display device, a display control device, and a transmit/receive unit.

Further, another exemplary embodiment of an information display system according to the invention comprise a server said that includes a map information storage, a schedule information storage, and a transmit/receive unit; and an information terminal that includes an input device, a display device, a display control device, and a transmit/receive unit.

Further, in another exemplary embodiment of an information display system according to the invention, the calendar and the map are simultaneously displayed on the display device by means of the display control device.

Further, in another exemplary embodiment of an information display system according to the invention, a route to the designated point is displayed onto a map drawn on the display device by means of the display control device.

Further, in yet another exemplary embodiment of an information display system according to the invention, a next closest schedule item relative to the present date and time is displayed on the display device by means of the display control device.

Further, in another exemplary embodiment of an information display system according to the invention, a point of the schedule item is displayed onto the map by means of the display control device.

Further, in yet another exemplary embodiment of an information display system according to the invention, a schedule item relevant to a date or a date and time, either of which being selected from the calendar, is listed on the display device by means of the display control device.

In another exemplary embodiment the information display system according to the invention comprises a map information storage that stores map information; an input device used to input a designated date or the designated date and time; a traffic information storage to store information relevant to the designated date or the designated date and time; a display device to display a calendar and a map; and a display control device used to control the display of the information relevant to the designated date or the designated date and time, either of which being selected from the calendar, on the display device.

Further, in this other exemplary embodiment of an information display system according to the invention, the information represents traffic information relevant to the designated date or the designated date and time, either of which being selected from the calendar.

Further, in this other exemplary embodiment of an information display system according to the invention, the information represents weather information relevant to the designated date or the designated date and time, either of which being selected from the calendar.

In yet another exemplary embodiment of an information display system according to the invention, the system comprises a map information storage that stores map information; an input device used to input a designated point relevant to a date or a date and time; a display device on which a calendar and a map are displayed; and a display control device by which traffic information relevant to a route represented on said map is displayed on said display device.

In a further exemplary embodiment of an information terminal according to the invention, the system comprises a display device on which a map is displayed; a present position detection device by which a present position is detected; and a display control device by which said present position is displayed on said display device; wherein, if a schedule item relevant to the present date and time is registered, said present position is corrected in accordance with a point of said schedule item.

In another exemplary embodiment of an information terminal according to the invention, if a distance from a present position to a point of the schedule item is below a predetermined value, the present position is matched with a point of the schedule item.

BRIEF DESCRIPTION OF THE DRAWINGS

The invention will be described with reference to the drawings, in which:

FIG. 6 shows a fourth view of a display screen of the information terminal according to the first exemplary embodiment of the invention.

FIG. 10 shows a first view of a display screen of the information terminal according to a third exemplary embodiment of the invention.

DETAILED DESCRIPTION OF PREFERRED EMBODIMENTS

Exemplary embodiments according to the invention will be described hereinafter in detail with reference to the accompanying drawings.

Figure 2:
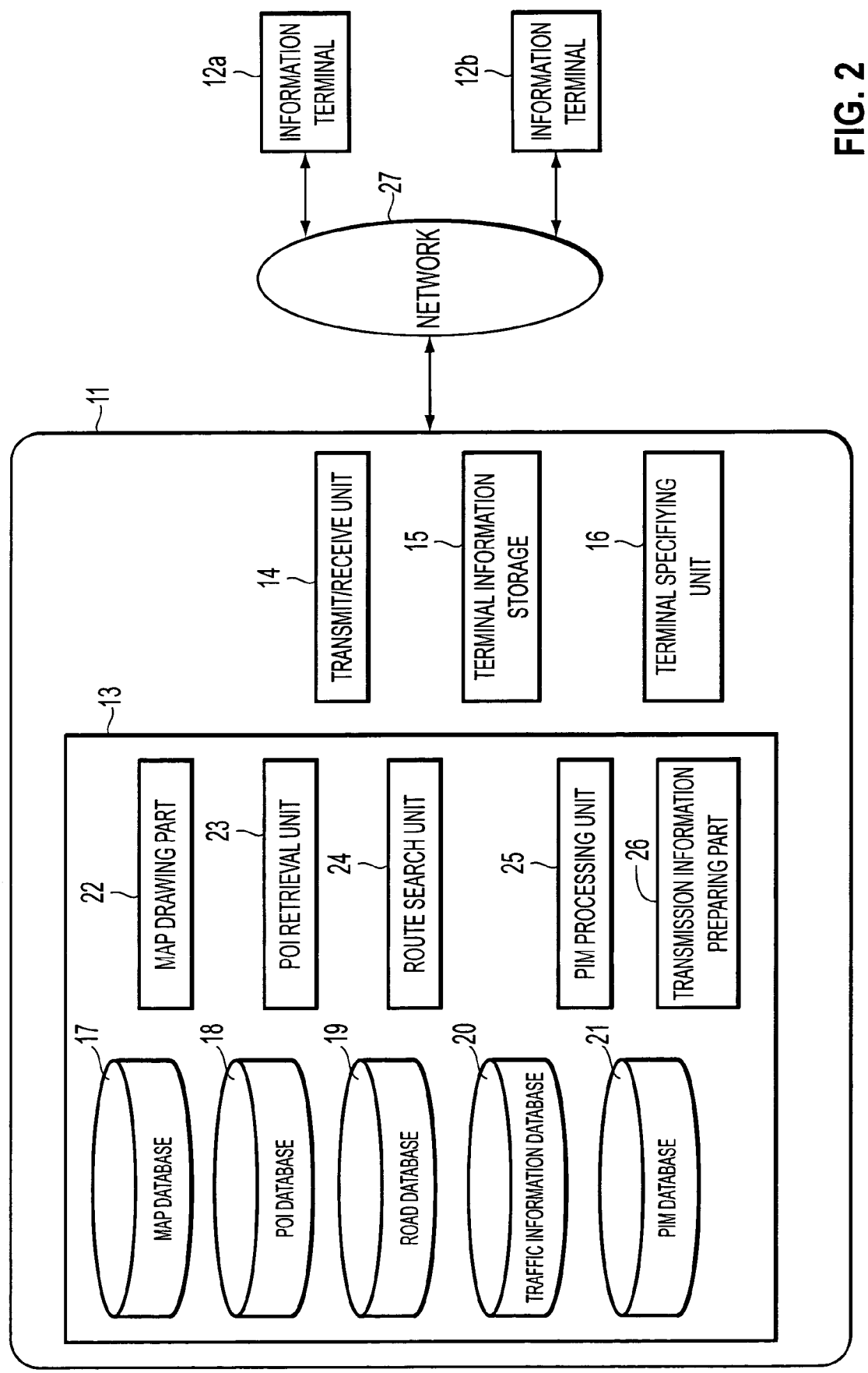
FIG. 2 is a block diagram of the information display system according to the first exemplary embodiment of the invention.

With reference to FIG. 2, a block diagram of the information display system according to a first exemplary embodiment of the invention is described.

In FIG. 2, an information providing server 11 is included in a computer which comprises an operation means such as a CPU or a MPU, a storage means such as a semiconductor memory, a magnetic disk, or an optical disk, and a communication interface. The computer is not being limited to a single computer, but it may be a decentralized server to which a plurality of computers is connected. Further, an alternative system may be structured within said computer. Furthermore, the information providing server 11 may be any one of systems structured in other computers.

Information terminals 12a and 12b are respectively used as a first information terminal and a second information terminal, with both operated by an operator. Although a plurality of the information terminals may be used in the information display system, the information terminals 12a and 12b are taken as examples in the present specification for convenience of explanation. The operator may be a driver or a fellow passenger of a vehicle, such as an automobile, a truck, a bus, or a motorcycle, and further it may be a pedestrian, a user of public transportation, or possible anyone.

Each of the information terminals 12a or 12b includes a main computing device such as a CPU or a MPU; a storage device such as a semiconductor memory, a magnetic disk, and an optical disk; a display device, such as, for example, a liquid crystal display, a LED (Light Emitting Diode) display, or a CRT; an input means such as, for example, a keyboard, a joystick, a cross-key, a push-button, a remote control, and a touch panel; a display control device that controls the display device; and a transmit/receive unit such as a communication interface. Generally, the information terminal 12a or 12b is a navigation apparatus equipped within a vehicle such as an automobile, a truck, a bus, or a motorcycle. Alternately, such information terminal may be any of apparatuses like a stationary telephone, a portable telephone, a personal handy phone (which used in PHS: Personal Handy-Phone System), a portable information terminal, a PDA (Personal Digital Assistant), a personal computer, a game machine, and a digital television.

Furthermore, each of the information terminals 12a or 12b may include a present position detection device (not shown). If either one of the information terminals 12a or 12b is a navigation apparatus for example, said present position detection device detects the present position of the vehicle by generally using a GPS (Global Positioning System), a terrestrial magnetism sensor, a distance sensor, a steering sensor, a beacon sensor, or a gyro sensor. If either of the information terminals 12a or 12b is a portable telephone or a portable information terminal for example, the present position detection device detects the position of a base station of the portable telephone or the portable information terminal as a present position, based on communication with the base station which covering an area where the portable telephone or the portable information terminal exists.

Based on the structure discussed above, the information providing server 11 and the information terminal 12a or 12b are connected with each other via a network 27 for mutual communication. The network 27 may be a wire/wireless public switched network, a private communication network, a portable telephone network, the Internet, an intranet, a LAN (Local Area Network), a WAN (Wide Area Network), a satellite communication network, any possible communication networks, or a certain combined network comprised of various networks. Further, the information providing server 11 may be communicated with the information terminal 12a or 12b via CS (Communication Satellite) broadcasting or BS (Broadcasting Satellite) broadcasting, also may be communicated via ground wave digital television broadcasting, FM (Frequency Modulation) multiplex broadcasting, or either via an optical beacon or a radio wave beacon which placed along a road.

Thus, the information display system according to the present embodiment generally includes the information providing server 11, the information terminal 12a, and the information terminal 12b.

The information providing server 11 includes: an information providing unit 13 from which information about a route to a destination is provided to the information terminal 12a or 12b in response to the transmission of start point information and destination information from the information terminal 12a or 12b; a transmit/receive unit 14 by which said information are intercommunicated between the information terminal 12a and the information terminal 12b; a terminal information storage 15 in which said information are separately stored for the information terminal 12a or 12b; and a terminal specifying unit 16 by which the information terminals 12a and 12b are respectively specified according to ID keys.

Specifically, the information providing unit 13 includes: a map database 17 as a map information storage; a POI (Point of Interest) database 18; a road database 19; a traffic information database 20 as a traffic information storage; and a PIM (Personal Information Manage) database 21 as a schedule information storage.

The map database 17 stores map information including nodes, links, coordinates, and names of facilities, which are used in drawing a map. The POI database 18 stores facility data, telephone number-and-address data, and event data, which are used in retrieving a point such as a start point, a destination point, and a passing point. The road database 19 stores data such as a road search cost and a road type, which are used in searching a route. Here, the cost represents a weight given to data used in searching a road.

Further, the traffic information database 20, especially under the road traffic information communication system, such as a VICS (Vehicle Information and Communication System), stores road traffic information and traffic regulatory information, which both relate to road congestion. These types of information are generated based on the information collected from a traffic regulatory system controlled by the police or the Japan Highway Traffic Corporation. Preferably, the traffic information database 20 may also store event schedule information relevant to a site and a date of the scheduled event such as a festival, a parade, or a fireworks display. Further desirably, the traffic information database 20 may store statistical congestion information like "A road running around a railway station or a mega commercial facility is congested every day during certain time periods except a weekend" or "A road running around a sea bathing resort during a summer vacation is congested." In addition, the traffic information database 20 desirably stores meteorological information such as weather information prepared by the Meteorological Agency.

Further, the PIM database 21 prepares and stores personal files corresponding to respective operators. Each personal file stores operator's information in the form of a schedule, a timetable, a calendar, an address book, and a telephone directory. Although generally the personal file is prepared for each one of the operators who have already been registered, it may be prepared on an information terminal basis or may be prepared on a registered ID basis when the operator has a plurality of registered IDs.

As a storage means for the information providing server 11 storing the map database 17, the POI database 18, the road database 19, the traffic information database 20, and the PIM database 21, either an internal storage medium or an external storage medium may be used. Such a medium may include any one of media, such as a magnetic tape, a magnetic disk, a magnetic drum, a CD-ROM, a MD (Mini Disk), a DVD-ROM, a DVD-RAM, an optical disk, a MO (magneto-optical) disk, an IC card, an optical card, a memory stick, a memory card, or any possible media.

The information providing unit 13 may include a map drawing unit 22, by which a map is drawn based on the map information; a POI retrieval unit 23, by which the point information like an coordinates, an address, and a name of the designated point as a destination are retrieved based on the information stored in the POI database 18; and a route search unit 24, by which a route from a present position to a destination is searched based on the information stored in the road database 19 and the traffic information database 20.

Furthermore, the information providing unit 13, may comprise a PIM processing unit 25 by which the operator's schedule, timetable, calendar, address book, and telephone directory are prepared and updated based on the information received from the information terminal 12a or 12b, and further by which some information included in said operator's schedule, timetable, calendar, address book, and telephone directory are extracted; and a transmission information preparing unit 26 by which information to be transmitted to the information terminal 12a or 12b is prepared and edited.

Further, the information providing unit 13 may include a destination setting unit, a predictive arrival time calculating unit, and a comparing unit (these are not shown). Additionally, the information providing unit 13 stores several programs such as a PIM program and a route search program. The PIM program is used to control a personal schedule, timetable, calendar, address book, and telephone directory, all which are generally used in the portable information terminal, the PDA, and the personal computer.

In operation, when position information of a destination and a passing point are registered with the timetable or the calendar, the destination setting unit sets the destination based on said position information. Further, based on information about the route searched by the route search unit 24, specifically based on the information, such as total time necessary to take each road section, the predictive arrival time calculating unit calculates predictive arrival time, i.e. the time when the vehicle arrives at the destination. Further, the predictive arrival time calculating unit may update the predictive arrival time at intervals of certain time. In such update, the predictive arrival time may be recalculated in consideration of the latest congestion information as well as the latest traffic regulatory information both stored in the traffic information database 20. Subsequently to the update of the predictive arrival time, the comparing unit compares the predictive arrival time with operator's desired arrival time.

Each of the information terminals 12a or 12b includes a transmit/receive unit (not shown) by which the information included in the schedule, timetable, calendar, address book, telephone directory, and other information are transmitted/received to/from the information providing server 11; and further includes a display control device (not shown). The display control device controls the display of the calendar and the map, which are both transmitted from the information providing server 11, onto the display device. Thus, a present position of either information terminal 12a or 12b, a destination, and a facility located around said present position are displayed onto the map. At the same time, it is desirable that information such as the desired arrival time, the predictive arrival time, a destination name, and a destination address be also displayed onto said map.

In the present embodiments, the information providing server 11 comprises the map database 17, the PIM database 21, the route search unit 24, and the PIM processing unit 25. The route search, as well as preparing or updating the timetable, the calendar, the address book, and the telephone directory may be performed in response to the request from the information terminals 12a or 12b. In return for such request, the results of said route search, preparation, or update may be transmitted back to the information terminal 12a or 12b. The data communication described above shows that simplification of the composition of the information terminal 12a or 12b is possible. That is, the information terminal 12a or 12b may be miniaturized and the manufacturing cost of the information terminals may be lowered.

Particularly for the route search, the information terminal 12a or 12b may include a database like the map database 17 and a means such as the route search unit 24, therefore, the composition of the information providing server 11 may be simplified and the running costs for the information display system may be advantageously lowered.

Moreover, the POI database 18, the road database 19, the traffic information database 20, the PIM database 21, the POI retrieval unit 23, the PIM processing unit 25, the destination setting unit, the predictive arrival time calculating unit, and the comparing unit may be included in the information terminal 12a or 12b, not included in the information providing server 11. In such case, the information providing server 11 is no longer required by the information display system.

The operation of the information display system in the structure discussed above will now be described.

Described below is an exemplary embodiment of a system according to the invention where the information providing server 11 comprises the map database 17, the PIM database 21, the route search unit 24, and the PIM processing unit 25. The route search, preparing and updating of the timetable, calendar, address book, and telephone directory are performed in response to the request from the information terminal 12a or 12b, and in return the results of said route search, preparation, and update are transmitted back to the information terminals 12a or 12b. Further, the description hereinafter is based on the assumption that the information terminal 12a is a portable telephone or a PHS telephone and the information terminal 12b is a navigation apparatus aboard a vehicle; and further based on the assumption that the either information terminal 12a or 12b is operated by the same person.

Figure 1:
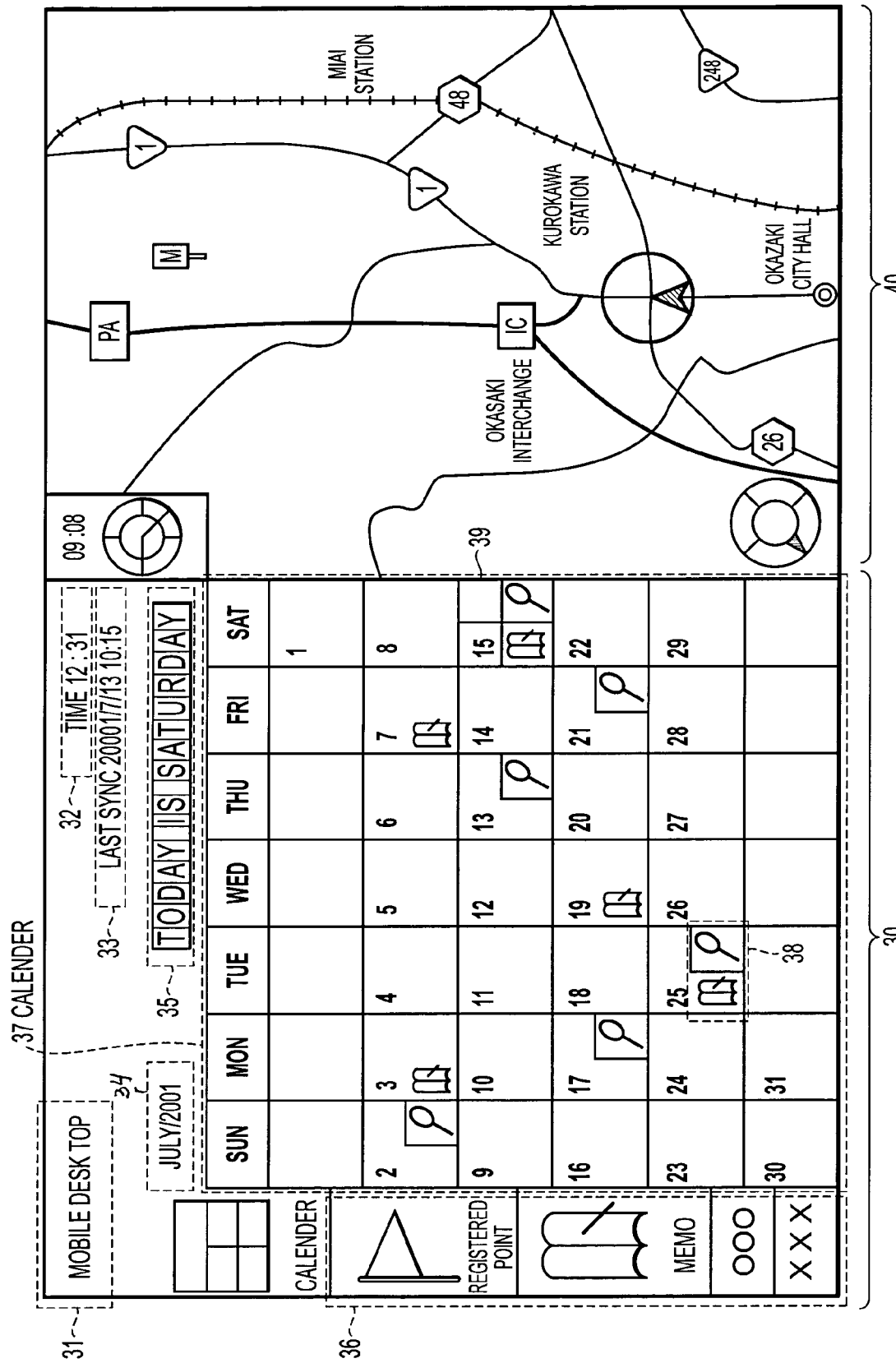
FIG. 1 shows a first view of a display screen of the information terminal according to a first exemplary embodiment of the invention.
Figure 3:
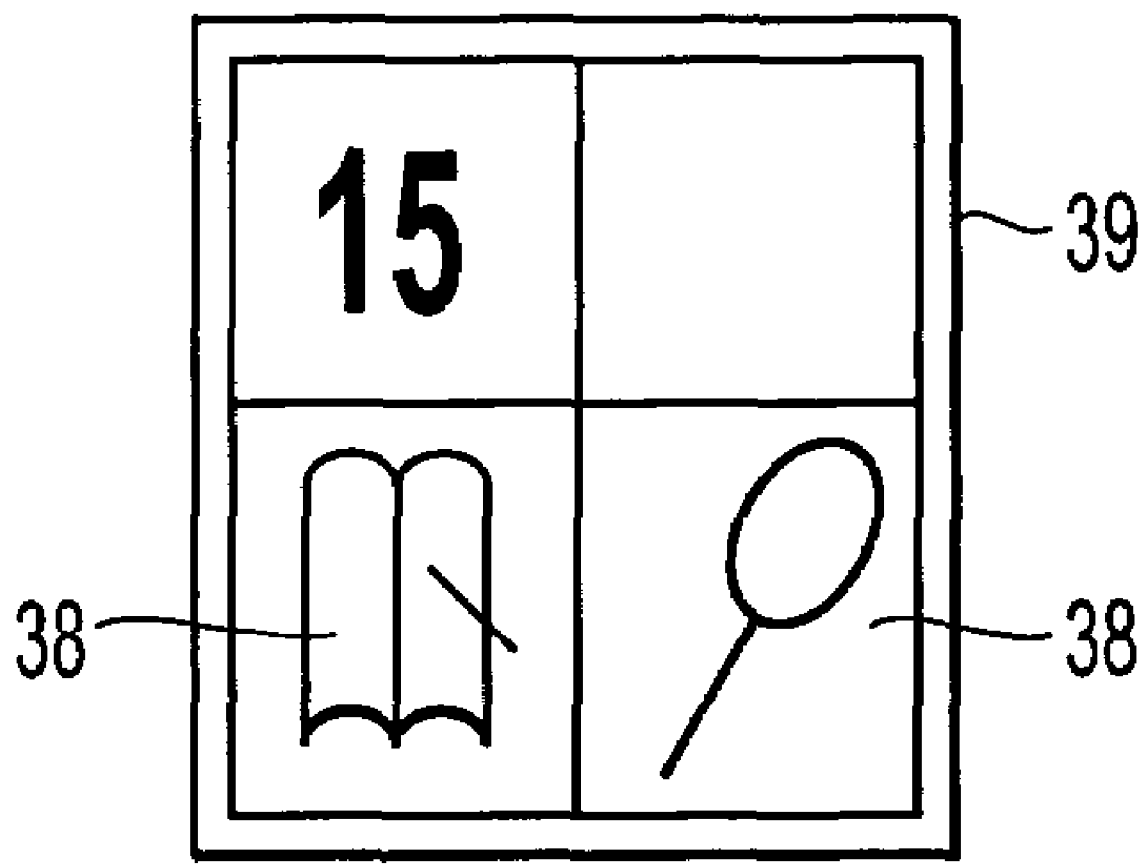
FIG. 3 is an enlarged view of a cursor provided onto a display screen of the information terminal according to the first exemplary embodiment of the invention.
Figure 4:
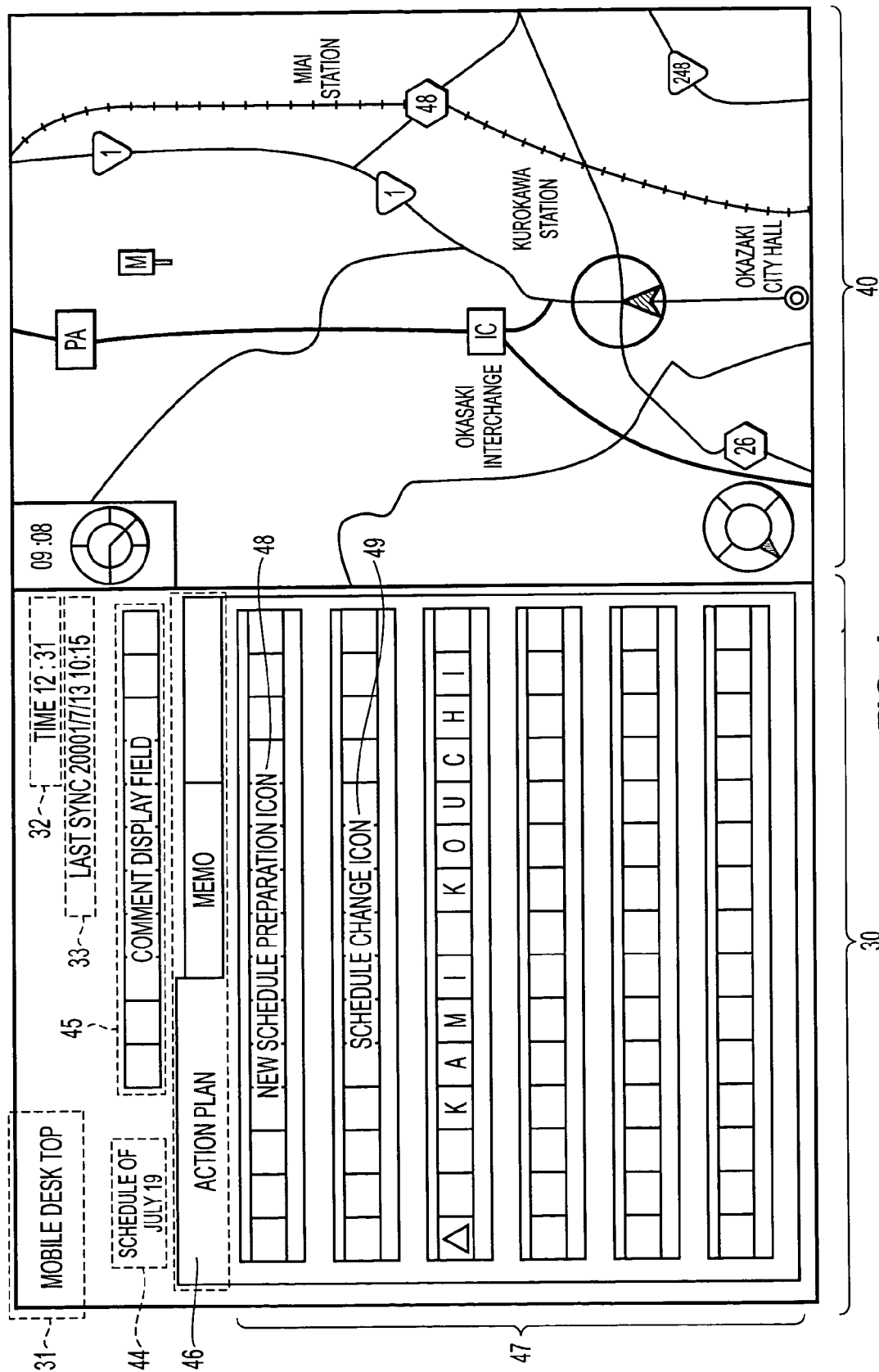
FIG. 4 shows a second view of a display screen of the information terminal according to the first exemplary embodiment of the invention.
Figure 5:
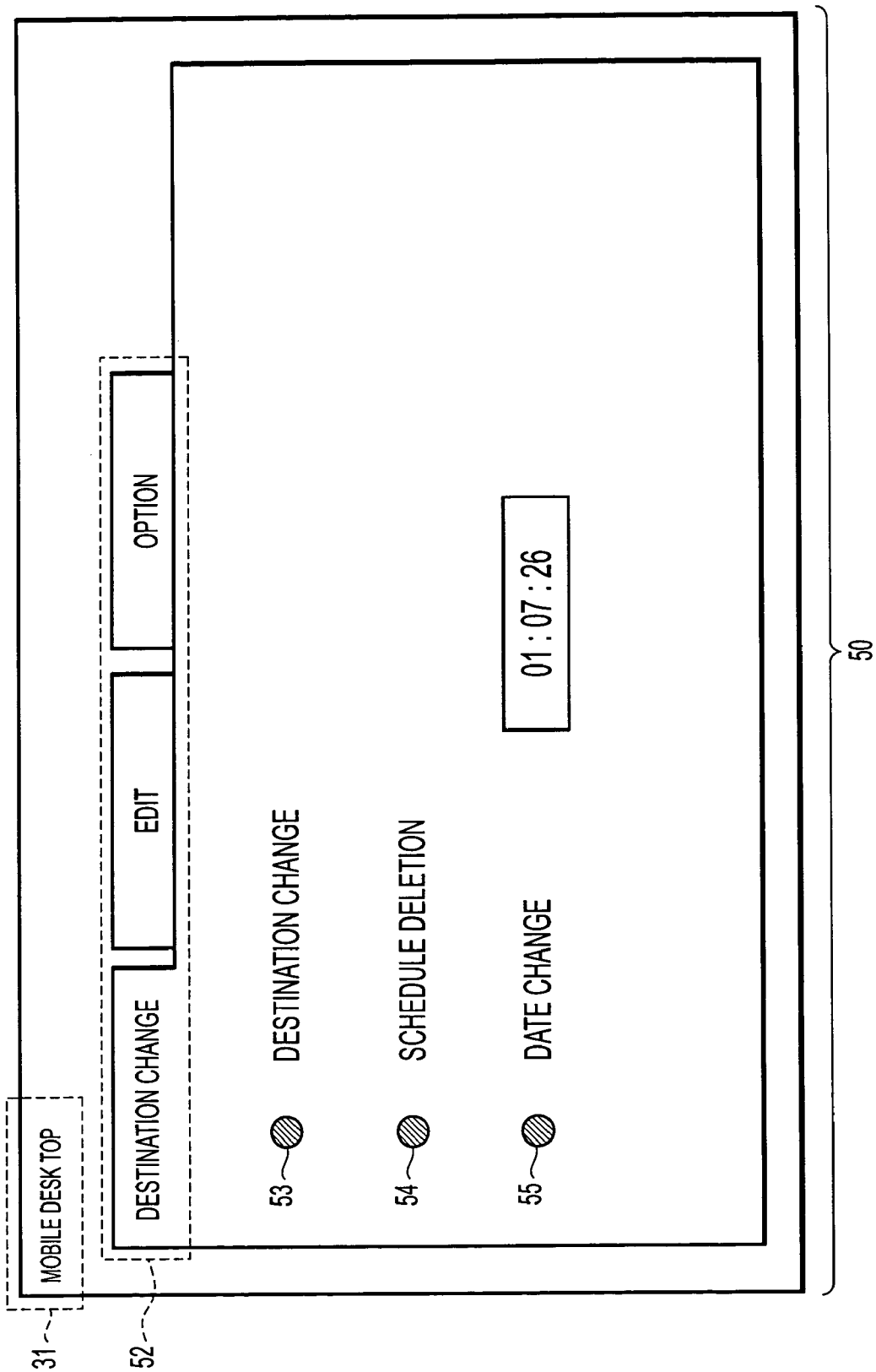
FIG. 5 shows a third view of a display screen of the information terminal according to the first exemplary embodiment of the invention.
Figure 6:
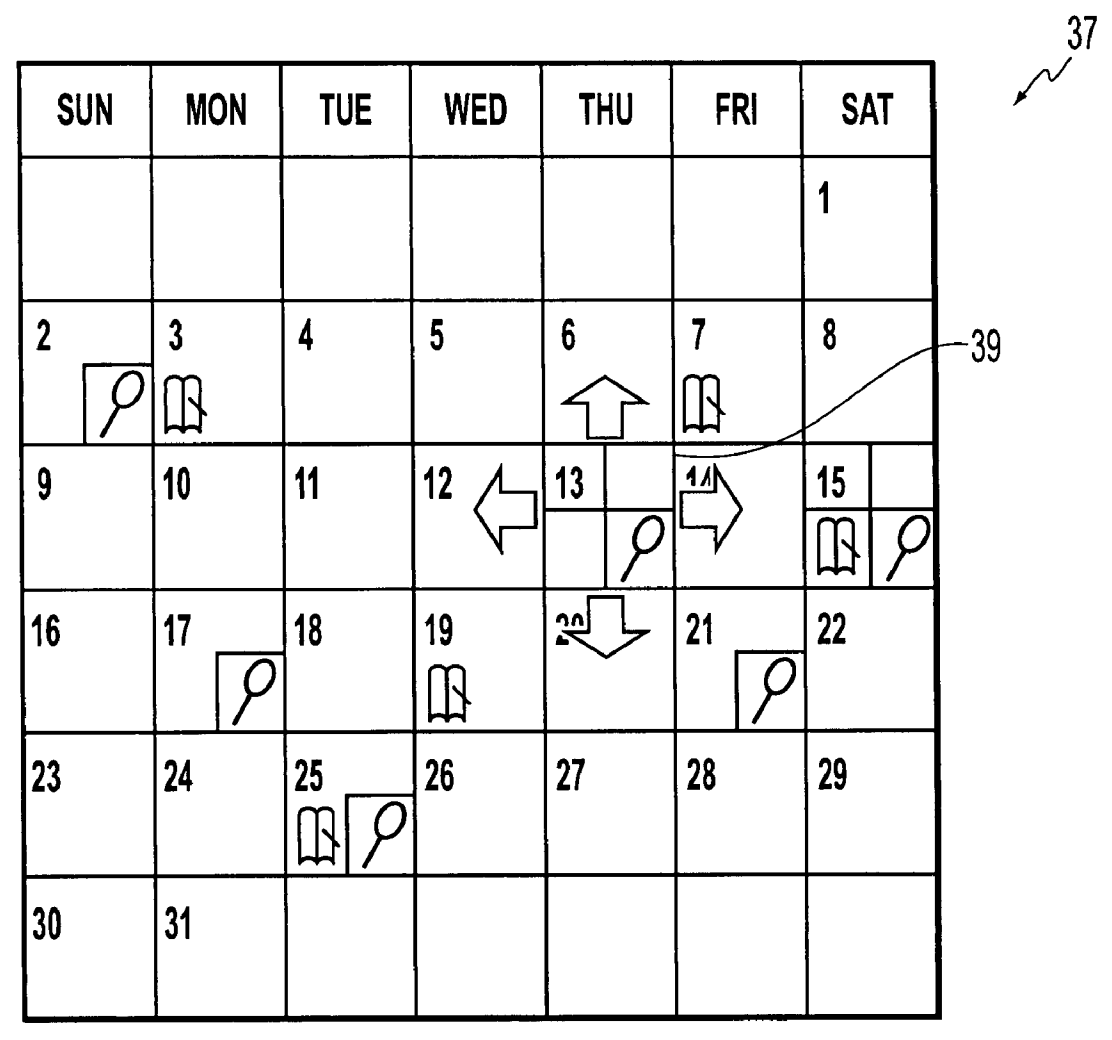
Figure 7:
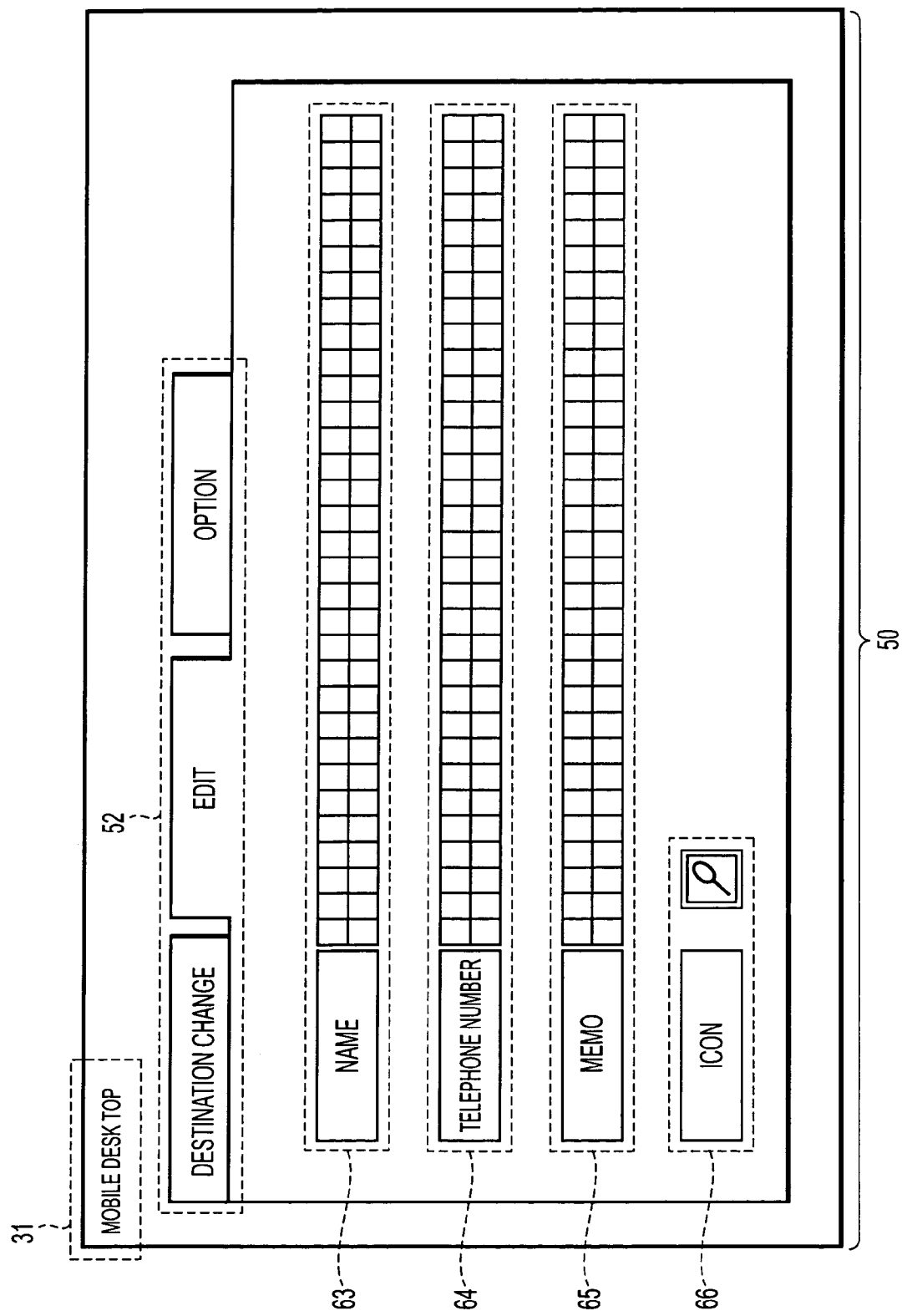
FIG. 7 shows a fifth view of a display screen of the information terminal according to the first exemplary embodiment of the invention.

FIG. 1 shows a first view of a display screen of the information terminal according to a first exemplary embodiment of the invention. FIG. 3 is an enlarged view of a cursor provided onto a display screen of the information terminal according to the first embodiment of the invention. FIG. 4 shows a second view of a display screen of the information terminal according to the first embodiment of the invention. FIG. 5 shows a third view of a display screen of the information terminal according to the first embodiment of the invention. FIG. 6 shows a fourth view of a display screen of the information terminal according to the first embodiment of the invention. FIG. 7 shows a fifth view of a display screen of the information terminal according to the first embodiment of the invention.

In operation, the operator operates the information terminal 12a to input his/her own plan for a next month, i.e. his/her schedule for a next month; for example, the driver's own schedule of work, study, hobbies, drives, trips, recreations, sports, eat-out, and sightseeing. Especially in the present description, the schedules such as a drive, a trip, recreations, sports, eat-out, and sightseeing are taken as examples, since a specific site point, a destination point, or a facility point as a target point of these schedules can be preset relevant to a date and time.

Then, in order to display a schedule input screen on the display device of the information terminal 12a, the operator starts the PIM program stored in the information terminal 12a. If the PIM program is not stored in the information terminal 12a, the operator accesses the information providing server 11 from the information terminal 12a via the network 27. Upon this access, the PIM program stored in the information providing server 11 is started to obtain the schedule input screen. When obtained, the schedule input screen is displayed on the display device in the information terminal 12a.

Subsequently, the operator inputs some items, such as, for example, a date and time, a point, an action plan, and/or a memo of his/her schedule, into the schedule input screen. For inputting those items, input fields whereon the operator respectively inputs the date and time, the point, the action plan, and the memo are displayed onto the schedule input screen. When the PIM processing unit 25 in the information providing server 11 functions to extract keywords relevant to said inputted items from sentences written by natural language, it is possible for the operator to input said items in memo form/note form into the schedule input screen. Thus, the point, the action plan, and the memo relevant to the date and time of the operator's schedule may be inputted into the schedule input screen. In this regard, it is possible to input only the date into the schedule input screen without the time when inputting the date and time of the schedule. Further, information such as an address or the position coordinates of the point of the schedule does not have to be so accurate when inputting the point of the schedule. Furthermore, it is possible to skip the action plan or the memo of the schedule when inputting the items into the schedule input screen.

The operator then operates the information terminal 12a to transmit the inputted said items to the information providing server 11 via the network 27. Then, the transmit/receive unit 14 receives the transmitted information from the information terminal 12a. Then, in order to specify the personal file relevant to the information terminal 12a and stored in the PIM database 21, the terminal specifying unit 16 extracts an ID key included in said transmitted information. Here, the description of the specifying the information terminal is based on the assumption that the personal file is so prepared corresponding to the operator that the ID key works as information to specify the operator.

In specifying the personal file, the PIM processing unit 25 extracts the items such as the date and time, the point, the action plan, and the memo of the operator's schedule from said transmitted information from the information terminal 12*a*. Upon the extraction, the PIM processing unit 25 accesses the POI retrieval unit 23 to obtain the position coordinates of the point of the specific site, destination, or facility as a target point of the operator's schedule. After the acquisition of the position coordinates, from the personal files stored in the PIM database 21 the PIM processing unit 25 accessibly selects the personal file which specified by the terminal specifying unit 16. Then, items such as the date and time, the point, the action plan, and the memo of the operator's schedule are stored in the selected personal file. In the present embodiment, when storing the items in the selected personal file, the date is extracted from the date and time of the operator's schedule. Related to this extracted date, the date and time, the point (including position coordinates), the action plan, and the memo of the operator's schedule are registered. Thus, the schedule inputted by the operator is registered with the personal file, which is relevant to the operator, stored in the PIM database 21.

Next, the operator operates the information terminal 12*b* to confirm his/her schedule for the next month. When confirming the schedule, the operator transmits a request for his/her schedule from the information terminal 12*b* to the information providing server 11 via the network 27. Then, the transmit/receive unit 14 receives the transmitted information from the information terminal 12*a*. At the same time, in order to specify the personal file stored in the PIM database 21 and relevant to the information terminal 12*a*, the terminal specifying unit 16 extracts the ID key included in said transmitted information. As described above, the personal file is prepared to correspond to the specific operator, thus the ID key works as information to specify the operator.

Subsequently, the PIM processing 25 extracts the items of the schedule for the next month from the specified personal file. In one case, the items include the point, the action plan, and the memo of the operator, all being registered relevant to the date and time of the schedule. Further, the extracted items are data-transformed through the transmission information preparing unit 26 and then transmitted from the transmit/receive unit 14 to the information terminal 12*b*. If the PIM program is not stored in the information terminal 12*b*, the PIM program is transmitted together with said items to the information terminal 12*b*.

Upon the receipt of the data-transformed items, the schedule including said items are displayed taking a form of a schedule display screen 30 which displayed on the display device by means of the display control unit in the information terminal 12*b* as shown in FIG. 1. In the schedule display screen 30, the next month calendar, for example, a calendar 37 representing July 2001 is displayed. Further, the schedule display screen 30 includes a title 31, present time (hour/minute) 32, last update date and time (year/month/day/hour/minute) 33, and a calendar month 34 (year/month).

Further, date information 35 indicates information about a date represented by a cursor 39 (described later). A tag (or an identifier) 36 represents other item, such as a registered point or a memo which is either displayable onto the schedule display screen 30. In addition, an icon 38 is displayed within a rectangle of each date in the calendar 37. The icon 38 in FIG. 1 shows that both the destination and the action plan have already been registered relevant to the corresponding date.

In the present embodiment, the rectangle of each date is surrounded by the cursor 39 that the rectangle is drawn in a bold line as shown in FIG. 3. The cursor 39 can be moved with the operation of the input device provided in the information terminal 12*b*. For example, up-down-right-left movement of the cursor 39 is performed with the operation of the joystick or the cross-key, or also performed with the input of numerals which indicating the date. In a case where the display device takes a form of a touch panel, the cursor 39 may be moved with touch of the rectangle of the date. In FIG. 3, the cursor 39 represents the date of July 15, and each icon 38 displayed within the rectangle shows that the destination and the action plan have already been registered.

When the operator tries to move the cursor 39 farther upwardly than the top line of the calendar 37, the previous month calendar (June) is displayed. Conversely, when the operator tries to move the cursor 39 farther downwardly than the bottom line of the calendar 37, the next month calendar (August) is displayed.

When the operator clicks the cursor 39 to designate the rectangle of July 15, the map display screen 40 as a map showing the registered point relevant to the corresponding date (here, for example, July 15) is displayed on the display device as shown in FIG. 1 by means of the display control device in the information terminal 12*b*. In this case, it is desirable that the schedule display screen 30 and the map display screen 40 are simultaneously displayed vertically or horizontally side by side. If the screen size of the display device is too small for said simultaneous display, the schedule display screen 30 and the map display screen 40 may be separately displayed from one after another.

In this regard, when the information terminal 12*b* stores the map information in the storage device and further includes the map drawing unit, a map is instantly drawn and displayed on the display device in the information terminal 12*b*. On the other hand, when the information terminal 12*b* does not store the map information and further does not include the map drawing unit, a request for drawing the map (which shows the registered point relevant to the corresponding date) is transmitted together with the information about the registered point from the information terminal 12*b* to the information providing server 11 via the network 27. Upon receipt of the request for drawing the map, the map-drawing unit 22 in the information providing server 11 accesses the map database 17 to draw a map which covering the destination point. Then, the map is data-transformed through the transmission information preparing unit 26. The transformed map is transmitted from the transmit/receive 14 to the information terminal 12*b* and then displayed on the display device in the information terminal 12*b*.

In an alternative embodiment, the map may be pre-drawn at the timing when the schedule inputted by the operator is registered with the personal file. Specifically, in such case, the PIM processing unit 25 extracts the destination from the inputted schedule and transmits the extracted destination to the map-drawing unit 22. Then, the map covering the extracted destination point is drawn. Next, the drawn map is stored relevant to the registered point and date into the operator's personal file in the PIM database 21 by means of the PIM processing unit 25. Then, the pre-drawn map may be transmitted back to the information terminal 12*b* at the same timing of the transmission of the items of the schedule to the information terminal 12*b* in response to the request from the information terminal 12*b*. Therefore, even if the information terminal 12*b* does not store the map information and also does not include the map-drawing unit, the information terminal 12*b* may promptly display the map covering the registered point onto the map display screen 40.

In addition, a retrieved facility located around the registered point may be displayed onto the map display screen 40. Specifically, when a type of the facility related to his/her action plan is inputted, the facility of the inputted type located around the registered point is retrieved. Further, when the information terminal 12*b* stores the POI information in the storage means and also includes the POI retrieval unit, the information terminal 12*b* may retrieve the facility located around the registered point and display it on the display device.

On the other hand, when the information terminal 12*b* does not store the POI information and also does not include the POI retrieval unit, the information terminal 12*b* transmits a request for the retrieval of the facility and the information about the registered point to the information providing server 11 via the network 27. Upon receipt of the request, the POI retrieval unit 23 in the information providing server 11 accesses the POI database 18 to retrieve the facility located around the registered point. Then, the retrieved facility is data-transformed through the transmission information preparing unit 26. The retrieved and data-transformed facility is transmitted from the transmit/receive unit 14 to the information terminal 12*b*, and then displayed on the display device in the information terminal 12*b*.

Regarding the retrieval and display of the facility, the facility may be pre-retrieved by means of the POI retrieval unit 23 at the timing when the schedule inputted by the operator is registered with the personal file. In such case, the PIM processing unit 25 extracts the registered point and the action plan from the inputted schedule, and transmits them to the POI retrieval unit 23. Then, the facility located around the registered point as well as related to the action plan is retrieved. The retrieved facility relevant to the registered point and date is stored in the operator's personal file in the PIM database 21 by means of the PIM processing unit 25. Thereupon, the pre-retrieved facility may be transmitted back to the information terminal 12*b* at the same timing of the transmission of the items of the schedule to the information terminal 12*b* in response to the request from the information terminal 12*b*. Therefore, even if the information terminal 12*b* does not store the POI information and also does not include the POI retrieval unit, the facility located around the registered point may be promptly displayed onto the map display screen 40 in the information terminal 12*b*.

Further, a route to the registered point may be retrieved and displayed onto the map display screen 40. Although this route search is generally performed using a destination as the designated point and a start point as an operator's house, both the destination and the start point may be freely designated at operator's will. When the information terminal 12*b* stores the road information in the storage means and also includes the route search unit, the information terminal 12*b* searches a route to the registered point and displays it on the display device.

On the other hand, when the information terminal 12*b* does not store the road information and also does not include the route search unit, the information terminal 12*b* transmits a request for the route retrieval and the information about the registered point to the information providing server 11 via the network 27. Upon the receipt of the request, the route retrieval unit 24 in the information providing server 11 accesses the road database 19 to search a route to the registered point. Then, the searched route is data-transformed through the transmission information preparing unit 26. The searched and data-transformed route is transmitted from the transmit/receive unit 14 to the information terminal 12*b*, and then displayed on the display device in the information terminal 12*b*.

Regarding the retrieval and display of the route, the route may be pre-searched by means of the route search unit 24 when the schedule inputted by the operator is registered with the personal file. In such case, the PIM processing unit 25 extracts the registered point and transmits it to the route retrieval unit 24. Then, the route to the registered point is retrieved. The retrieved route relevant to the registered point and date is stored in the operator's personal file in the PIM database 21 by means of the PIM processing unit 25. Thereupon, the pre-retrieved route may be transmitted back to the information terminal 12*b* at the same timing of the transmission of the items of the schedule in response to the request from the information terminal 12*b*. Therefore, even if the information terminal 12*b* does not store the road information and also does not include the route search unit, the route to the registered point may be promptly displayed onto the map display screen 40 in the information terminal 12*b*.

When searching a route, the route search unit 24 may access the traffic information database 20 in which the traffic information such as the congestion information and the traffic regulatory information to be taken into account are stored. Further, the route search unit 24 may search a route by predicting congestion occurrence based on the accumulated statistical information and scheduled event information. For example, in a case where the vehicle passes a road running around a rail station or a mega commercial facility and also it is statistically confirmed that said road is congested everyday except a weekend at certain time periods like in the evening, the route search unit 24 may so perform the route search that such congested route is excluded. In addition, the route search unit 24 may so perform the route search that roads running around the scheduled event site of a festival, a parade, or a fireworks display are excluded, since the congestion which occurring around such event site can be predicted in the present system.

In another way of searching the route, the route search unit 24 may search a route based on the meteorological information such as weather information stored in the traffic information database 20. For example, when heavy rain is predicted, the route search unit 24 may so perform the route search that a mountain route on which a slip accident frequently occurs is excluded.

In other way of searching the route, when the traffic information such as the traffic regulatory information and the congestion information, as well as the accumulated statistical information, the scheduled event information, and the meteorological information are all stored in the storage means in the information terminal 12*b*, the information terminal 12*b* may search a route without the transmission of the request for the route search to the information providing server 11.

Regarding the traffic information, when the operator designates the date indicated by the cursor 39, the map which covering the registered point may be displayed on the display device, and further the traffic information such as the congestion information and the traffic regulatory information both relevant to said designated date may be displayed onto the road which represented in said map.

The information terminal 12*b* transmits a request for the traffic information and the information about the registered point to the information providing server 11. Upon the receipt of the request, the route search unit 24 in the information providing server 11 accesses the traffic information database 20 to predict the traffic information such as the congestion occurrence and the traffic regulation based on the accumulated statistical information and the scheduled event information about roads running around the registered point. Specifically, taking into account the day of a week, seasons, and the operator's action plan which all related to the designated date, the route search unit 24 predicts said traffic information such as the congestion occurrence and the traffic regulation. Then, the predicted traffic information of the designated date is data-transformed through the transmission information preparing unit 26. The transformed traffic information is transmitted from the transmit/receive 14 to the information terminal 12b and then displayed on the display device in the information terminal 12b.

In this regard, the predicted traffic information may be stored relevant to the registered point and the designated date into the operator's personal file in the PIM database 21.

When the information terminal 12b stores the traffic information such as the congestion information and the traffic regulatory information as well as the accumulated statistical information and the scheduled event information in the storage device, it enables the information terminal 12b to predict the traffic information such as the congestion occurrence and the traffic regulation without the transmission of the request for the traffic information to the information providing server 11.

Regarding a weather forecast, when the operator designates the date indicated by the cursor 39, the map covering the registered point is displayed on the display device and the weather forecast for the designated date may be displayed onto the road represented in said map.

The information terminal 12b transmits a request for the traffic information and the information about the registered point to the information providing server 11. Upon the receipt of the request, the route search unit 24 in the information providing server 11 accesses the traffic information database 20 to obtain the meteorological information such as the weather forecast for the area around the registered point. Then, the meteorological information of the designated date is data-transformed through the transmission information preparing unit 26. The transformed meteorological information is transmitted from the transmit/receive unit 14 to the information terminal 12b and then displayed onto the display device in the information terminal 12b.

In this regard, the meteorological information may be stored relevant to the registered point and the designated date into the operator's personal file in the PIM database 21.

When the information terminal 12b stores the meteorological information such as the weather forecast in the storage device, it enables the information terminal 12b to display the meteorological information on the display device without the transmission of the request for the traffic information to the information providing server 11.

Thus, with the designation of the date, the traffic information and the weather forecast of the area around the point relevant to the designated date may be displayed on the display device. Thereby, the operator may confirm or change his/her schedule referring to said displayed traffic information and the weather forecast.

Regarding the traffic information, the traffic information of the designated road may be displayed in the calendar 37 upon the operator's designation of the road represented in the map on the map display screen 40.

The information terminal 12b transmits a request for the traffic information and the road data of the designated road to the information providing server 11. Upon the receipt of the request, the route search unit 24 in the information providing server 11 accesses the traffic information database 20 to predict the traffic information such as the congestion occurrence and the traffic regulation based on the accumulated statistical information and the scheduled event information about the designated road. When the congestion occurrence or the traffic regulation about the designated road is predicted, a date when the congestion occurs or a date when the traffic being regulated is extracted. Then, the extracted date is data-transformed through the transmission information preparing unit 26. The data-transformed date is transmitted from the transmit/receive unit 14 to the information terminal 12b and displayed onto the display device in the information terminal 12b.

For example, assuming that a summer festival is held on July 3 at a certain area around the road designated by the operator. In such case, the system predicts that said designated road would be congested on July 3. Therefore, the rectangle of July 3 is indicated as shown in FIG. 1. From this indication, the operator may be informed of the congestion occurrence on the designated road on July 3. Such information advantages the operator to change his/her schedule if necessary.

The operation of changing the pre-inputted schedule will be described below.

For the operation of the schedule change, the operator moves the cursor 39 to the designated date, for example, the rectangle of July 13 in FIG. 1. Then, the operator clicks the cursor 39 or operates a certain button provided on the input device to confirm his/her action plan for July 13. Upon the manipulation of the cursor 39 or the certain button on the input device, the schedule display screen 30 changes to another screen shown in FIG. 4. The schedule display screen 30 includes a title 31, present time 32, and last update date and time 33.

Further, in the schedule display screen 30, a date display (day/month) 44 shows a designated date, an information display 45 shows an action plan, and a tag 46 shows other items, such as a memo, which displayable onto the schedule display screen 30. The operator's action plan is specifically inputted to an action plan input field 47. Further, a new schedule preparation icon 48 and a schedule change icon 49 are displayed on the action plan input field 47. When the new schedule preparation icon 48 is selectively selected, a screen for preparation of a new action plan is displayed. In addition, when the schedule change icon 49 is selectively selected, a screen for changing the action plan is displayed.

Specifically, when the operator selectively clicks on or selects the schedule change icon 49, a schedule change screen 50 is displayed as shown in FIG. 5. Although the schedule change screen 50 is displayed full to the screen size of the display device in FIG. 5, it may be displayed side by side with the map display screen 40 as shown in FIG. 1 or FIG. 4.

In the schedule change screen 50, tags 52 for the displayable items such as "Destination change", "Edit", and "Option" are displayed. When the "Destination change" is selected, a destination change icon 53, a schedule deletion icon 54, and a date change icon 55 are displayed. When the destination change icon 53 is selectively clicked, a screen for setting the destination is displayed. Further, when the schedule deletion icon 54 is selectively clicked, a screen for confirming the schedule deletion is displayed.

In addition, when the date change icon 55 is selectively clicked, either a date input screen for inputting a date or the calendar 37 shown in FIG. 6 is displayed. Numerals representing a new date are inputted into the date input screen. In the calendar 37, the cursor 39 is movable for changing the date.

When the tag 52 of "Edit" is selectively clicked, the schedule change screen 50 changes to another screen shown in FIG. 7. Then, on the another schedule change screen 50, there displayed a name input field 63 for inputting a name, a telephone number input field 64 for inputting a telephone number, a memo input field 65 for inputting a memo, and an icon selection field 66 for selecting an icon.

Further, the selection of the name input field 63 produces a display of a Japanese syllable input palette into which a name is inputted on syllable-by-syllable basis. The selection of the telephone number input field 64 produces a display of a numeral input palette into which a telephone number is inputted on numeral-by-numeral basis. Furthermore, the selection of the memo input field 65 produces a display of a Japanese syllable input palette into which a memo is inputted on syllable-by-syllable basis. Moreover, the selection of the icon selection field 66 produces a display of an icon selection screen from which an icon is selected.

Although the present embodiment explains the case where the schedule is inputted with the operation of the information terminal 12a and the schedule is confirmed with the operation of the information terminal 12b, conceivably the schedule may be inputted with the operation of the information terminal 12b and the schedule is confirmed with the operation of the information terminal 12a. Further, the input and confirmation of the schedule may be performed with the operation of a single information terminal. In a case where said single information terminal comprising a POI database 18, a road database 19, a traffic information database 20, a PIM database 21, a POI retrieval unit 23, a PIM processing unit 25, a destination setting unit, a predictive arrival calculating unit, and a comparing unit, the schedule may be inputted and confirmed without the access to the information providing server 11.

Further, although the present embodiment explains about the confirmation of the future schedule, not only the future schedule but also the past schedule may be confirmed insofar as the information stored in the PIM database 21 is not deleted. When the specific site point, destination point, or facility point which relevant to the past drive, trip, recreations, sports, eat-out, or sightseeing is inputted together with its corresponding date, the past record may be displayed. That is, the information display system according to the present embodiment may be used to display the past record.

Thus, as understood from the above described embodiment, the preliminarily registration of a specific site point, a destination point, or a facility point relevant to the scheduled date produces the display of the calendar 37 and the map which are used for confirmation of the operator's schedule. Additionally, the selection of a certain date from the calendar 37 produces the display of the map which covering a point relevant to the selected certain date.

Then, the operator may readily identify the scheduled specific site point, destination point, or facility point on the map, where each point represents the target point of the driver's schedule such as a drive, a trip, recreations, sports, eat-out, or sightseeing. At the same time, the operator may be readily informed of the state of the road and the facility located around said point.

Particularly, regarding the display of the traffic information and the weather information, the present embodiment describes the system that may search and display a route to the scheduled point as well as may display the predictive traffic information and the weather forecast of the area around the scheduled point on the scheduled date. Thus, upon the designation of the date, the traffic information or the weather forecast of the area around the scheduled point on the scheduled date may be displayed on the display device. Thereby, the operator may confirm or change his/her schedule referring to the displayed traffic information and the weather forecast.

Further, upon the designation of the road represented on the map, the traffic information of said designated road may be displayed in the calendar 37. Thereby, the operator may so prepare and change his/her schedule that the date when the designated road being congested is excluded.

Further, advantageously according to the present embodiment, both the calendar 37 and the map are displayed on the display device in the information terminal 12b based on the schedule inputted from the information terminal 12a. This means specifically that the display of the calendar 37 and the map on the display device of the navigation apparatus is based on the operator's own schedule which inputted into the personal computer, the electronic personal organizer, and the portable telephone. That is, the date or the destination may be inputted without the additional operation of the navigation apparatus.

Hereinafter, a second embodiment according to the invention will be described. For convenience of explanation, the same compositions and the same operations according to the first embodiment are not described referring to FIG. 8 and FIG. 9.

Figure 8:
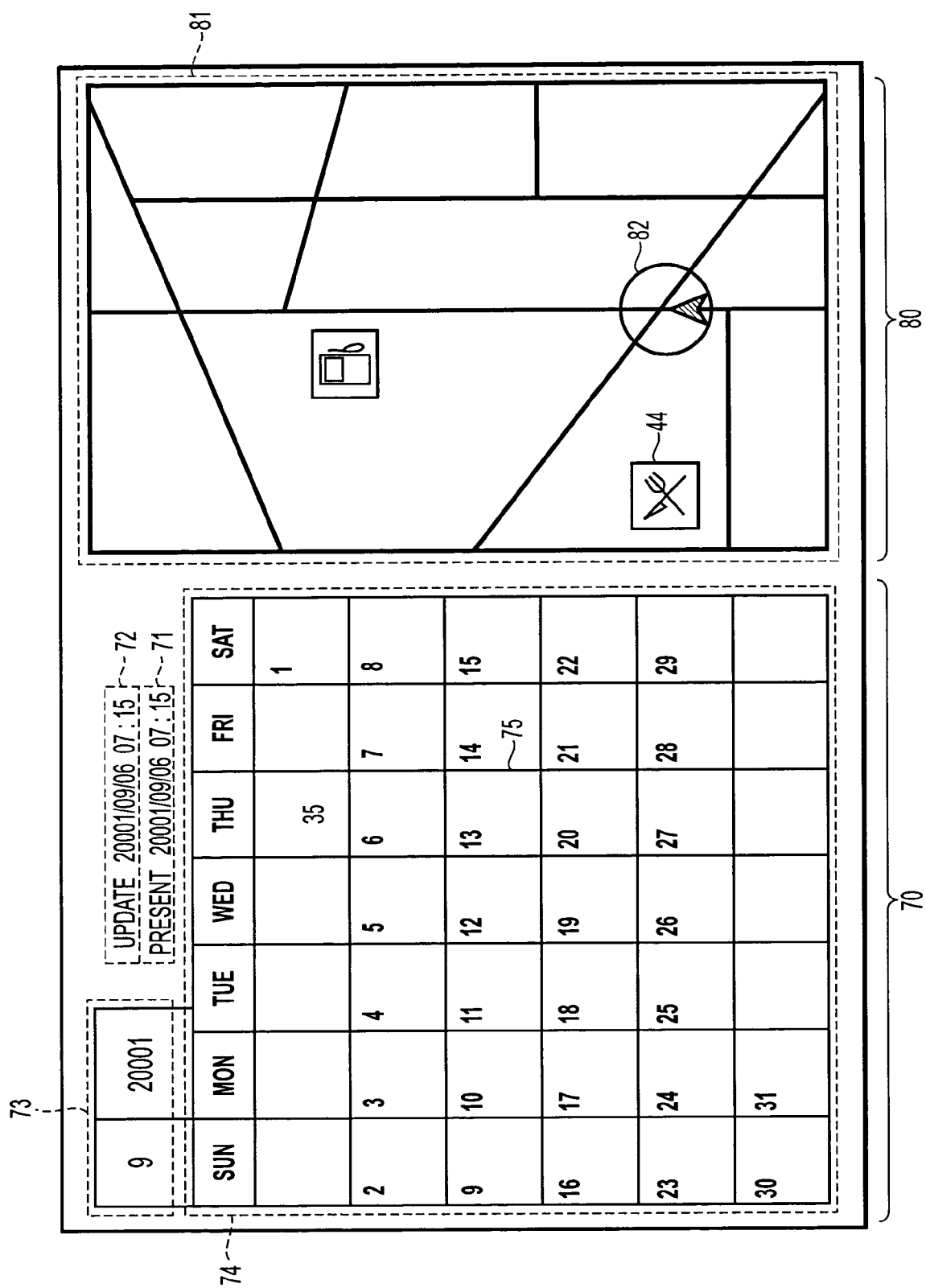
FIG. 8 shows a first view of a display screen of the information terminal according to a second exemplary embodiment of the invention.
Figure 9:
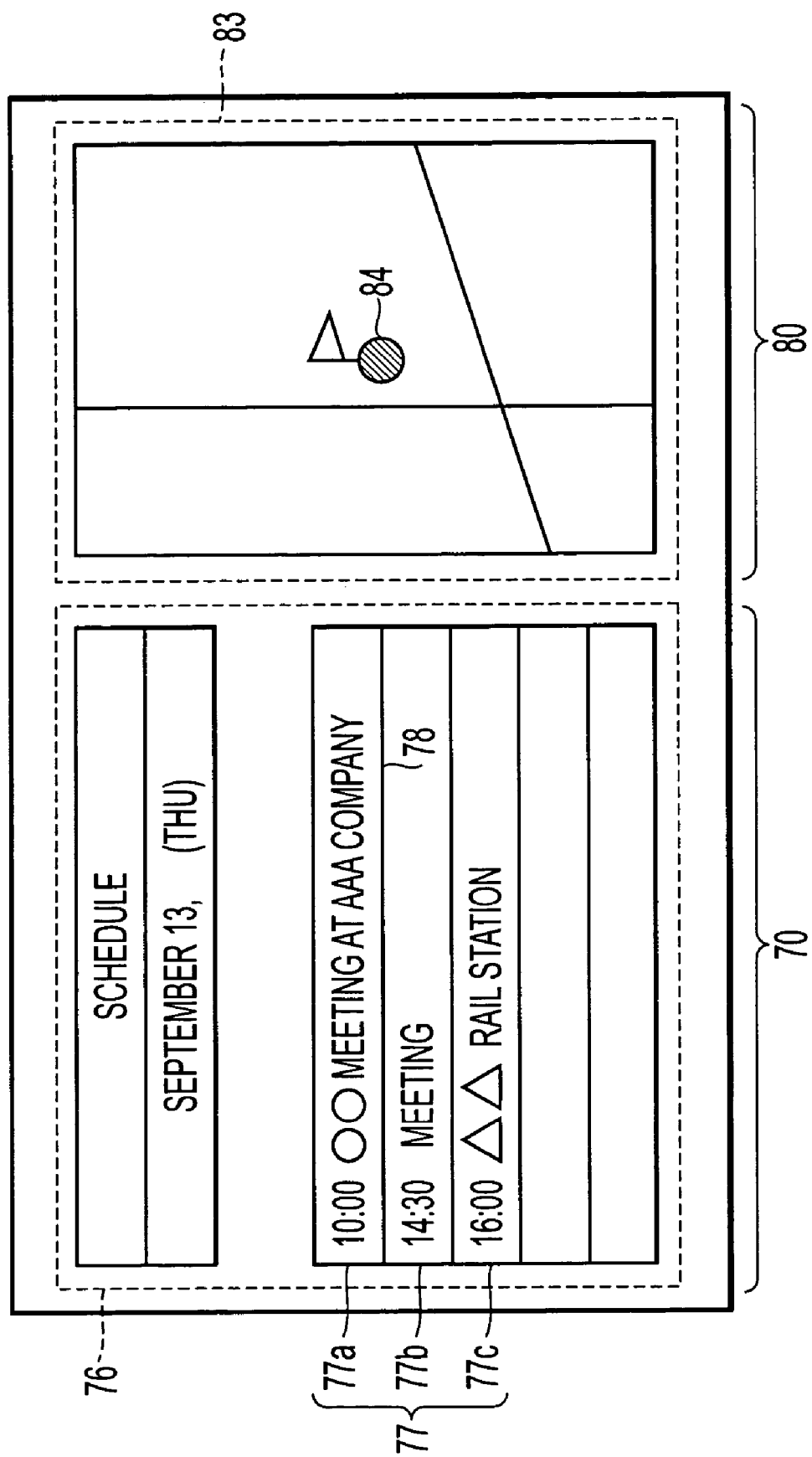
FIG. 9 shows a second view of a display screen of the information terminal according to the second exemplary embodiment of the invention.

FIG. 8 shows a first view of a display screen of the information terminal according to a second embodiment of the invention. FIG. 9 shows a second display screen of the information terminal according to the second embodiment of the invention.

In the second embodiment, the map of a point relevant to a closest future schedule item is displayed on the display device based on the present date and time. This enables the operator to readily identify the site point, the destination point, and the facility point which respectively relevant to the schedule items. Further, a state of the facility and roads located around said point may be informed to the operator.

In the present second embodiment, both a schedule display screen 70 and a map display screen 80 are displayed on the display device in the information terminal 12b as shown in FIG. 8. For example, a calendar 74 as a present month calendar which representing "September 2001" is displayed onto the schedule display screen 70. Further, the schedule display screen 70 includes present date and time (year/month/day/hour/minute) 71, last update date and time (year/month/day/hour/minute) 72, and a calendar month (year/month) 73. Further, a map 81 covering an area around the present position of the information terminal 12b is displayed onto the map display screen 80. Here, a present position mark 82 is included in the map 81.

In the calendar 74, a cursor 75 is located on a rectangle of the present date i.e., a today's date. When the operator selectively clicks the cursor 75 located on the rectangle of the present date, a schedule detail display 76 which listing a today's schedule items 77 is displayed on the display device in the information terminal 12b as shown in FIG. 9. For example, in FIG. 8 the present date and time 71 shows that the today's date is "September 13" and thereby the cursor 75 is located on the rectangle of September 13.

The schedule detail display 76 includes a plurality of schedule items, for example, three schedule items 77a, 77b, and 77c. In FIG. 9, a cursor 78 is located on a rectangle of the schedule item 77b which representing the closest future schedule item relative to the present date and time. Since the present date and time 71 shows "2001 Sep. 13 14:17", the schedule item 77a is a past schedule relative to the shown present date and time, the schedule item 77b is the closest future schedule item relative to the present date and time, and the schedule item 77c is the second closest future schedule item relative to the present date and time. Therefore, the schedule item 77b is selected as the closest future schedule item, and then the cursor 78 is located on the rectangle of the schedule item 77b. Thereby, the schedule item 77b being the next schedule relative to the present time may be clearly informed to the operator.

Further, a map 83 covering a point of the closest future schedule item 77b relative to the present date and time may be displayed on the display device in the information terminal 12b; and further a mark 84 representing the point of the closest future schedule is also included in the map 83. For example, in FIG. 9 the closest future schedule item 77b shows the schedule of a "meeting." Therefore, the mark 84 indicates a place where the meeting is held.

As for the selection and display of the today's date, the closest future schedule 77b may be automatically retrieved and displayed onto the map display screen 80 and then the map 83 which including the point of the schedule 77b is automatically displayed without the operator's selective-clicking operation of the today's date. That is, instead of the map 81 covering the area around the present position, the map 83 including the point of the closest future schedule 77b may be automatically displayed according to the present date and time 71. Therefore, the point of the schedule item 77b which should be carried out next may be clearly identified by the operator without his/her operation.

Further, in a case where the rectangle of the present date or today's date has no schedule items, any one of the closest future schedule items 77 relative to the today's date is automatically retrieved and displayed, and then the map 83 including the point of the retrieved schedule item 77 is automatically displayed. Taking FIG. 9 for example, if the rectangle of the present date or today's date has no schedule items, both the schedule item 77a representing an earliest schedule among the next day schedules and the map 83 including the point of said schedule item 77a are automatically displayed.

Additionally, in a case where the operator moves the cursor 75 to a desired date except the today's date on the schedule display screen 70 shown in FIG. 8 to select the desired date by clicking the cursor, the schedule detail display 76 listing the schedule items 77 of said desired date is displayed. After the display of the schedule detail display 76, the map 83 including the point of any one of the schedule items 77 listed in the schedule detail display 76 is displayed onto the map display screen 80.

In this regard, when the schedule detail display 76 lists a plurality of the schedule items 77, specifically lists a plurality of the schedules like items 77a, 77b, and 77c as shown in FIG. 9, it is preferable that the map 83 displays the point of the first-listed item, for example, the schedule item 77a. When the operator moves the cursor 78 to the desired schedule items 77 and selectively clicks one of them, the map 83 including the point of the selected one desired schedule item 77 may be displayed. Thereby, the schedule detail display 76 may clearly inform the operator of the point of the selected desired schedule item 77. This enables the operator to obtain one desired schedule item 77 and identify the point thereof even if a plurality of the schedule items 77 are planned for a day.

Furthermore, even if a plurality of the schedule items 77 for the desired date are listed on the schedule detail display 76, all points of said schedule items 77 may be displayed on the map. For example, when the schedule items 77a, 77b, and 77c are listed on the schedule detail display 76 as shown in FIG. 9, all points of the schedule items 77a, 77b, and 77c are displayed together onto the map 83.

In this regard, when the every point of the schedule item is located apart from one after the other, a scale of the map may be changed in order that every said point is included in the same map. Specifically, when a point of AAAA company as the schedule item 77a is located apart from a point of BBBB rail station as the schedule item 77c, the map 83 is scaled down in order that the AAAA company and the BBBB rail station are both displayed within the same map display screen 80. This enables the operator to identify every point of the every schedule item 77 for the desired date at once and also enables to readily obtain brief information about his/her scheduled entire movement for the desired date.

Thus, in the present second embodiment, the next closest future schedule item 77b and the map 83 covering the point of the next closest future schedule item 77b are together automatically displayed based on the present date and time. Thereby, without any operations by the operator, contents of the schedule item 77b to be carried out next and the site point, the destination point, or the facility point of the schedule item 77b may be informed to the operator.

Further, when the operator selects the desired point, the schedule items 77 for the selected desired date are listed. Then, upon the selection of any one of the desired schedule items 77 from such list, the map 83 including the point of the selected schedule item 77 is displayed. Thereby, the contents and the point of the selected schedule item 77 for the desired date may be readily informed to the operator.

Hereinafter, a third embodiment according to the invention will be described referring to FIG. 10, FIG. 11, and FIG. 12. For convenience of explanation, the same structure and operations according to the first embodiment and the second embodiment are not described.

FIG. 10 shows a first display screen of the information terminal according to a third embodiment of the invention. FIG. 11 shows a second display screen of the information terminal according to the third embodiment of the invention. FIG. 12 is a flowchart illustrative of an operation by the information terminal according to the third embodiment of the invention.

In the third embodiment, a present position detection device is included in the information terminal. Therefore, a present position detected by the present position detection device is corrected with respect to a point which registered as an item relevant to the operator's schedule. This enables the display of an accurate present position onto a map even if the present position detection device has low accuracy.

In the third embodiment, details of inputted schedules are displayed taking a form of a schedule detail display 85 on the display device in the information terminal 12b as shown in FIG. 10. Although the schedule detail display 85 is displayed full to the screen size of the display device as shown in FIG. 10, it may be displayed side by side with the map display screen as shown in FIG. 1, FIG. 4, FIG. 8, and FIG. 9. The schedule detail display 85 includes a scheduled date and time field 86 for showing the date and time of a schedule item, a name field 88 for showing a name of a point of the schedule item, a memo field 89 for showing a memo about the schedule item, an address field 90 for showing an address of the point of the schedule item, a telephone field 91 for showing a telephone number to be referred to, and a input date field 92 for showing a day when the schedule item is inputted.

Figure 11:
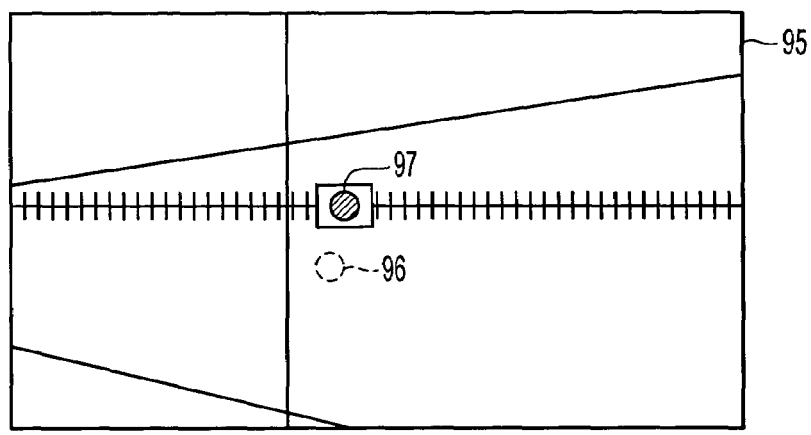
FIG. 11 shows a second view of a display screen of the information terminal according to the third exemplary embodiment of the invention.
Figure 12:
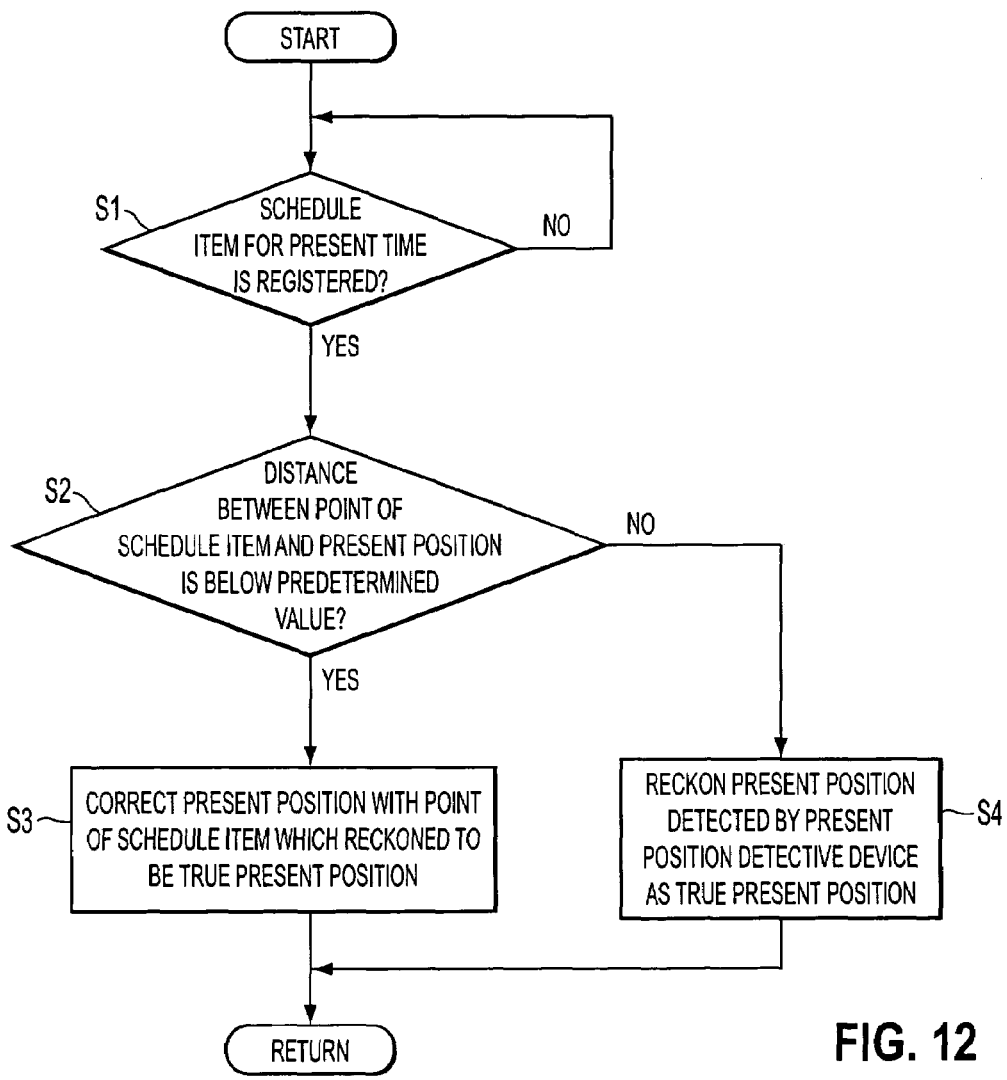
FIG. 12 is a flowchart illustrative of the operation by the information terminal according to the third embodiment of the invention.

Further, in the present third embodiment, a map 95 covering an area around the present position is displayed on the display device as shown in FIG. 11 by means of the display control device in the information terminal 12b. Although the map 95 is displayed full to the screen size of the display device in FIG. 11, it may be displayed side by side with the schedule display screen as shown in FIG. 1, FIG. 4, FIG. 8, and FIG. 9. In addition, a present position mark 96 is included in the map 95.

With the above composition, the PIM processing unit 25 in the information providing server 11 accessibly selects a personal file of the operator (as a possessor of the information terminal 12b) from personal files stored in the PIM database 21 to check whether the schedule item for the present time is registered with the selected personal file.

Here, the selection of the personal file will be described taking a case where the schedule item is registered for the date and time of "2001 Sep. 13 16:00" as shown in FIG. 10. Referring to this "2001 Sep. 13 16:00," the PIM processing 25 repeatedly checks whether the schedule item for the present time is registered with the selected personal file. This operation continues until it is 16:00 on Sep. 13, 2000. When it is 16:00 on Sep. 13, 2000, the PIM processing unit 25 decides that the schedule item for the present time is registered with the personal file, and then extracts a name of the point of the schedule item; for example, BBBB rail station as shown in FIG. 10. Subsequently, the PIM processing unit 25 accesses the POI retrieval unit 23 to obtain position coordinates of the BBBB rail station as the point of the schedule item. Then, the position coordinates of the BBBB rail station is transmitted to the information terminal 12b.

Upon receipt of the position coordinates, the information terminal 12b judges whether a distance between the position coordinates of the BBBB rail station as the point of the schedule item and the present position detected by the present position detection device is lower than a predetermined value. When said distance is judged as being below the predetermined value, the information terminal 12b considers the point of schedule item as a correct present position, and then so corrects the detected present position as to match the point of the schedule item. This position correction is founded on the idea that the position coordinates of the point of the schedule item based on the map information has less error than the present position detected by the present position detection device in the information terminal such as the information terminal 12b. Further, in the third embodiment, when the distance between the point of the schedule item and the present position detected by the present position detection device is below the predetermined value, it is supposed that the information terminal 12b exists actually on the point of the schedule item, i.e. it is supposed that the operator takes his/her actions in accordance with his/her schedule. Therefore, a present position mark 96 on the map 95 covering an area around the present position of the information terminal 12b is corrected to a position 97 of the BBBB rail station as the point of the schedule item.

On the other hand, if the distance between the BBBB rail station as the point of the schedule item and the present position detected by the present position detection device is judged as not being below the predetermined value, the information terminal 12b considers the detected present position as a true present position. Therefore, the detected present position is not corrected. This is because that the information terminal 12b is considered to be located at the point of the schedule item when the distance between the point of the schedule item and the present position detected by the present position detection device is above the predetermined value.

Further, in a case where the information terminal 12b includes the PIM processing unit 25, the PIM database 21, and a POI retrieval unit 23, the aforesaid operations in the present third embodiment are performed by the information terminal 12b alone in the absence of the communication with the information providing server 11.

A flowchart shown in FIG. 12 will be specifically described below.

Step S1: Judge or determine whether a schedule item for a present time is registered. If the schedule item is registered, go to Step S2. If the schedule item for the present time is not registered, said judgment is repeatedly performed until the schedule item is registered.

Step S2: Judge or determine whether a distance between a point of the schedule item and a present position is below a predetermined value. If the distance is judged as being below the predetermined value, go to Step S3. If the distance is not judged as being below the predetermined value, go to Step S4.

Step S3: Correct the present position with the point of the schedule item considered to be a true present position.

Step S4: Consider the present position detected by the present position detection device as a true present position.

Thus, in the third present embodiment, the information terminal 12b includes the present position detection device, and the present position detected by the present position detection device is corrected based on the point of the schedule item. Thereby, the accurate present position may be displayed onto the map even if the present position detection device has low accuracy. This enables the operator to readily identify the accurate present position.

As many different embodiments of the invention may be made without departing from the spirit and scope thereof, it is to be understood that the invention is not limited to the previously mentioned embodiments.

For example, the invention may include information display program for controlling a computer which comprising a map information storage in which map information is stored, an input device by which a certain point is inputted relevant to a certain date, a schedule information storage in which said point inputted relevant to said date is stored, a display device on which a calendar and a map are displayed, and a display control device by which a map of a point related to a date being selected from the calendar is displayed on the display device.

Further, the invention may include a computer-readable storage medium for storing an information program for controlling a computer which comprising a map storage in which map information is stored, an input device by which a certain point is inputted relevant to a certain date, a display device on which a calendar and a map are displayed, and a display control device by which a map of a point which related to a date being selected from the calendar is displayed on the display device.

The invention is applicable to any information display systems.

The invention claimed is:

1. An information display system, comprising:
   (a) a map information storage in which map information is stored;
   (b) an input device used to input a designated point relevant to a date or a date and time;
   (c) a schedule information storage that stores the designated point relevant to the date or the date and time;
   (d) a route search device that, in advance of the date or the date and time, selects a route to the designated point based on the date or the date and time;
   (e) a display device that displays a calendar and a map
   (f) a selection device that allows the selection of either the date or the date and time; and
   (f) a display control device that, upon selection of either the date or the date and time:
      controls the display of the map, the map covering the designated point relevant to the date or the date and time, either of the date or the date and time being selected from the calendar and displayed on the display device and the map being displayed based on the date or the date and time;
      simultaneously displays the calendar and the map on the display device; and
      displays, on the map, the route to the designated point.

2. An information display system according to claim 1, comprising:
   (a) a server that includes the map information storage, a schedule information storage, and a transmit/receive unit;
   (b) a first information terminal that includes the input device and a transmit/receive unit; and
   (c) a second information terminal that includes the display device, a display control device, and a transmit/receive unit.

3. An information display system according to claim 1, comprising:
   (a) a server that includes the map information storage, a schedule information storage, and a transmit/receive unit; and
   (b) an information terminal that includes the input device, a display device, a display control device, and a transmit/receive unit.

4. An information display system according to claim 1, wherein the route search device selects the route to the designated point based on predicted traffic information for the date or the date and time.

5. An information display system according to claim 1, wherein the route search device selects the route to the designated point based on predicted meteorological data for the date or the date and time.

6. An information display system according to claim 1, wherein the route search device selects the route to the designated point based on traffic regulatory information for the date or the date and time.

7. An information display system according to claim 1, wherein, if a there is no selection of the date or the date and time, a next closest schedule item relative to a present date and time is displayed on the display device by means of the display control device.

8. An information display system according to claim 7, wherein a point of the schedule item is displayed onto the map by means of the display control device.

9. An information display system according to claim 1, wherein a schedule item relevant to a date or a date and time, which either selected from the calendar, is listed on the display device by means of the display control device.

10. An information display system, comprising:
    (a) a map information storage that stores map information;
    (b) an input device used to input a designated date or a designated date and time;
    (c) a traffic information storage in which traffic information relevant to the designated date or the designated date and time is stored;
    (d) a display device that simultaneously displays a calendar and a map;
    (e) a selection device that allows the selection of either a date or a date and time; and
    (f) a display control device that, upon selection of either the date or the date and time, displays the traffic information relevant to the selected date or the selected date and time on the map.

11. An information display system according to claim 10, wherein the traffic information represents weather information relevant to the designated date or the designated date and time.

12. An information terminal, comprising:
    (a) a display device that displays a map;
    (b) a present position detecting device by which a present position is detected;
    (c) a display control device to control the display of the present position on the display device;
    (d) wherein, if a schedule item relevant to a present date and time is registered, the present position is corrected in accordance with a point of the schedule item.

13. An information terminal according to claim 12, wherein if a distance from a present position to a point of the schedule item is below a predetermined value, the present position is matched with a point of the schedule item.

* * * * *